July 23, 1968   R. N. GOLDMAN   3,394,246
STATUS-INDICATING SYSTEM
Filed April 8, 1963   2 Sheets-Sheet 1
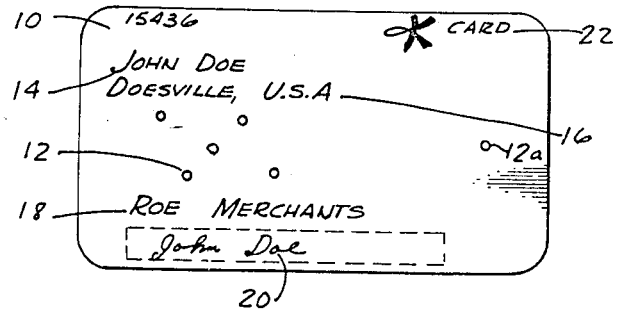
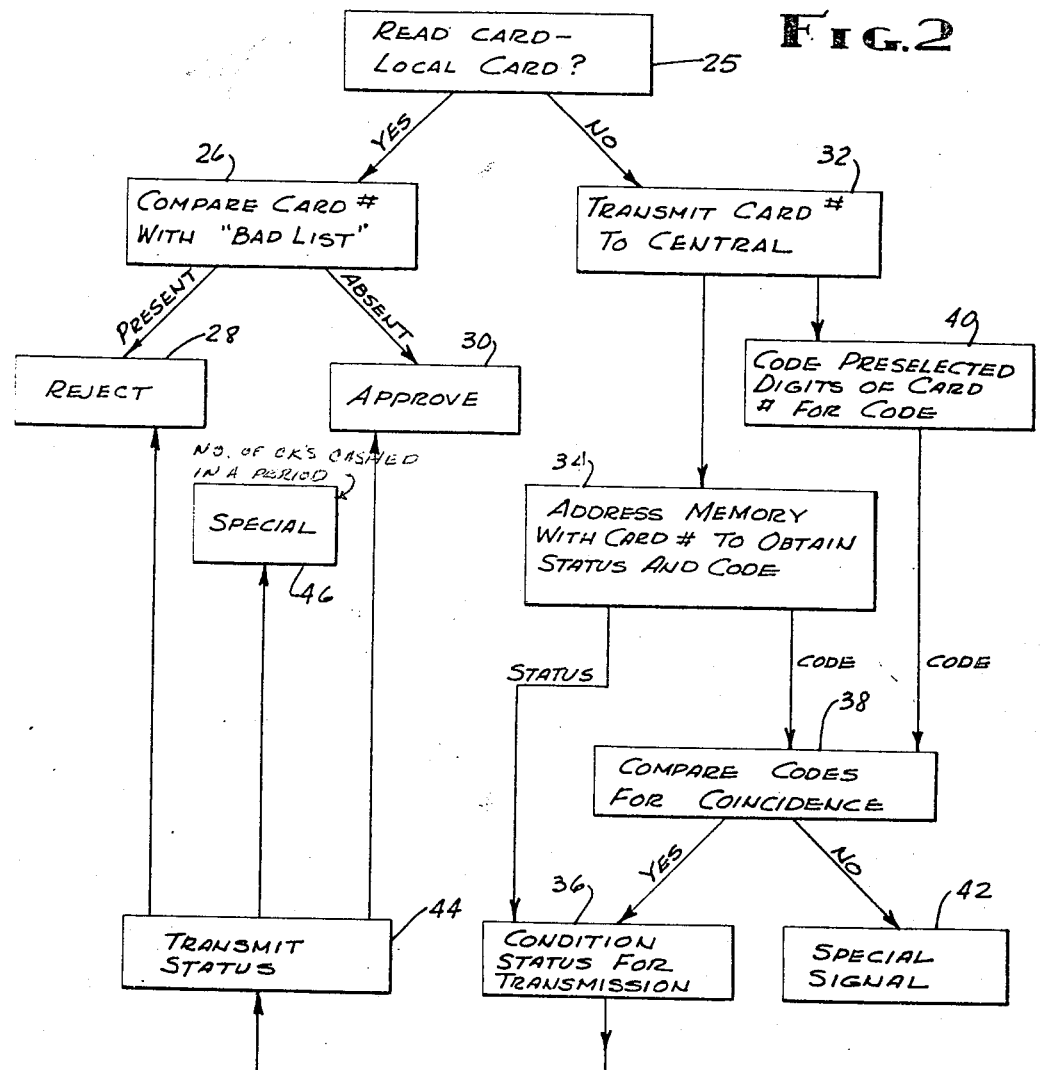
INVENTOR.
ROBERT N. GOLDMAN
BY Nilsson & Robbins
ATTORNEYS.

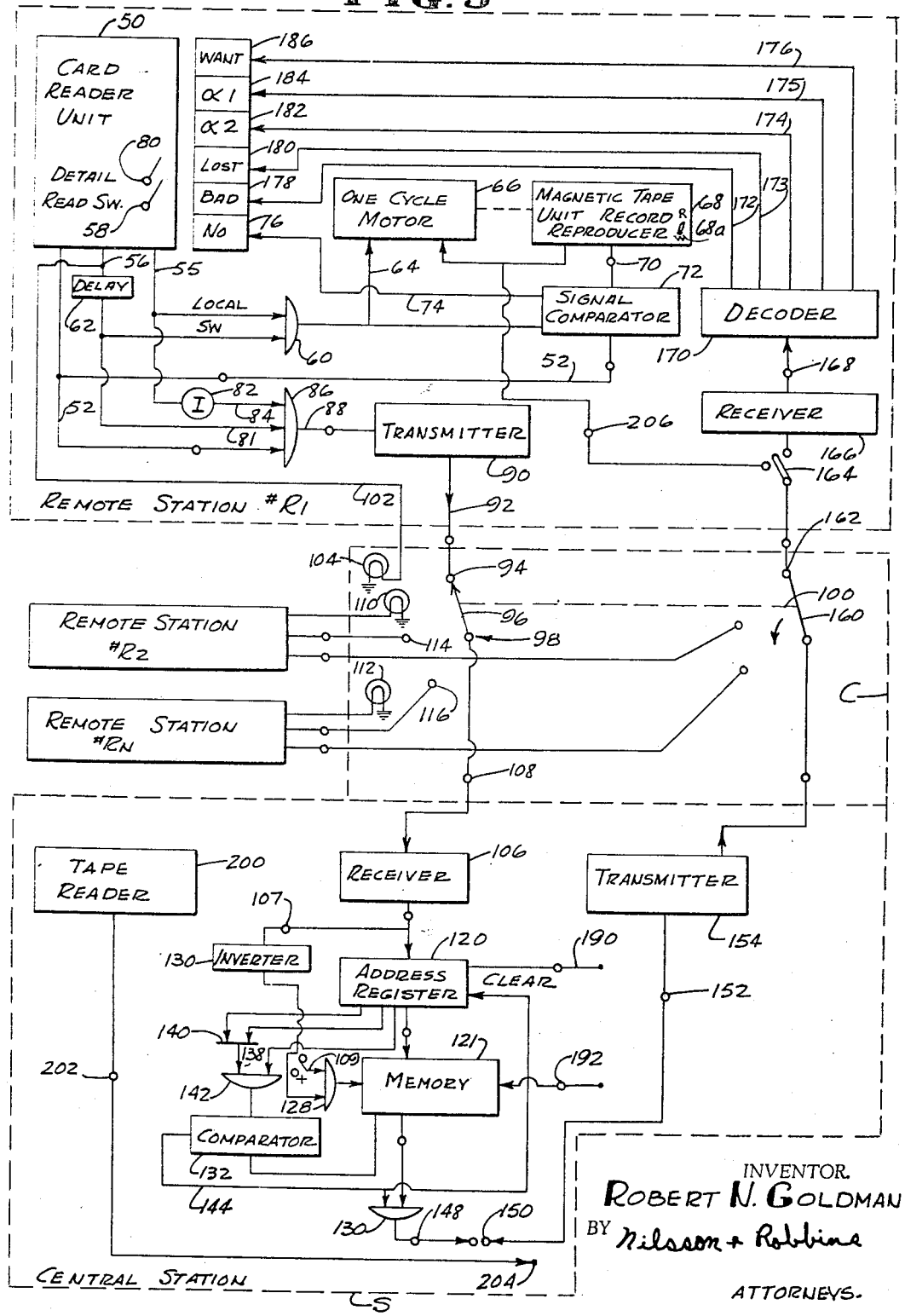

United States Patent Office 3,394,246
Patented July 23, 1968

3,394,246
STATUS-INDICATING SYSTEM
Robert N. Goldman, Los Angeles, Calif., assignor to Telecredit, Incorporated, a corporation of California
Filed Apr. 8, 1963, Ser. No. 271,081
8 Claims. (Cl. 235—61.7)

ABSTRACT OF THE DISCLOSURE

A machine system to accommodate widespread use of credit cards by registering the status of card holders, and indicating their status upon the presentation of a card. The system permits use of cards issued by different authorities so that a card issued by one store can be used at a cooperating store, both stores being serviced by the machine system. Signals identifying the card holder and the card-issuing authority (store) are sensed from the card by station equipment. Depending upon whether the signals indicating the authority coincide with the station authority at which a card is presented the system searches a local or remote register. Therefore, each authority has a register of its void cards as one part of the system. A central register, containing the status of all the cards then responds to inquiries involving a card issued by one authority and presented at another.

The present invention relates to a system for verifying and indicating status, and is particularly useful in conjunction with credit cards, charge-plates and similar devices.

Various types of cards and plates have come into widespread use to identify persons to whom credit may be extended. Specifically, for example, many retail organizations issue identification cards to their customers which permit the customers to charge various goods and services upon presentation of the card. In general, the use of credit cards is worthwhile for the sales organizations because a greater volume of business results by allowing persons to charge goods and services, so that they may avoid the need for carrying cash, and also receive a permanent periodic record of the goods and services which they have purchased. However, individual merchandising organizations seldom have the facilities to: properly screen customers to whom cards should be issued, maintain up-to-date status information on card-carrying customers, and collect bad debts from card-carrying customers. As a result of these considerations, several organizations have provided credit cards or devices to a large number of consumers, under an arrangement whereby numerous retailers permit goods or services to be charged upon presentation of the identification card.

Although arrangements of this type have come into widespread use, several disadvantages are attendant the various prior systems which have been developed. For example, the card-issuing organization encounters a substantial amount of bad credit and therefore has rather high operating expenses which are recovered variously from either or both the consumer and the merchandising organization.

The amount of bad credit experienced by the card-issuing organization could be reduced by various prior techniques and systems for approving each and every charge. However, such techniques are unfeasible due to the volume of issued cards. Specifically, the operation of clearing each and every charge authorized by thousands of cards would involve a prodigious and economically impossible effort. Furthermore, the time consumed in performing each individual charge clearance would probably delay the consumer causing him inconvenience, even if a vast army of personnel and equipment were used to perform the operation by any existing or known manner.

As a result of these considerations, credit card-issuing organizations usually rely only upon expiration dates to void their cards frequently, at which times new cards are issued only to valid customers who are responsible for their credit. Therefore, existing credit card methods are often marginable for many merchandising organizations with the result that they often refuse to accommodate customers desiring to charge goods or services.

In general, credit and various devices associated with credit have come into widespread use only to obtain goods and services from merchandising organizations. That is, there must be a potential profit involved before a merchandising organization can afford to assume the risk and expense of allowing a customer credit. Therefore, the customer who desires cash and wishes to tender a check to a merchant does not normally receive any accommodation merely by presenting his credit card. Of course, the manner of handing these situations varies radically among different merchandising organizations. However, generally, mere possession of a credit card is not a satisfactory introduction to permit a person to cash a check of any substantial amount.

The service of cashing checks for customers, could be very valuable to a retailing organization, providing losses were minimum. That is, by cashing checks, merchandising organizations can attract customers to their establishments and provide them with cash. Under such circumstances, consumers tend to become regular, and furthermore increase their purchases at such establishments. Therefore, a need exits for a credit card or device which may be widely employed with relatively small risk of bad credit so as to accommodate check-cashing customers as well as charge-account customers.

In general, the present invention provides a system for indicating the status of persons by use of a card or other device, which carries personal identification and group identification associating the card with a particular merchandising organization. The person may present his card at any of a plurality of merchandising organizations which are remote from a central station; however, the card remains identified wtih one particular merchandising organization as indicated on the cards. Cards presented at the merchandising organization with which they are associated are simply checked against a relatively small list of the void cards of the group issued by that merchandising organization. The list of void cards may be frequently updated as by an automatic transmission from the central credit station.

The presentation of a card at a merchandising organization with which it is not identified results in an inquiry to the central credit station at which current records for all cards are maintained to provide an indication of status back to the retailing organization receiving the card.

The system of identifying each card with a particular retailing organization results in many transactions which do not require an inquiry to the central credit station. As a result, the credit cards can be issued to a great number of people, yet by such a division, virtually every purchase or transaction is verified to indicate the current status of the person to whom goods, services, or money are delivered.

These features along with objects of the invention will become apparent from a consideration of the following taken in conjunction with the accompanying drawings, wherein:

FIG. 1 is an exemplary credit card which may be used in conjunction with the system of the present invention;
FIG. 2 is a diagrammatic representation indicative of the mode of operation of a system constructed in accordance with the present invention; and FIG. 3 is a block and schematic diagram of a system constructed in accordance with the present invention.

The system of the present invention operates in conjunction with a credit card or other device that serves to identify the card holder. Of course, the card or device may take many forms, one of which is shown in FIG. 1 and may be made of metal, plastic or other stiff material. The customer is identified by a number which appears on the card as readable numerals 10 and in a coded form 12 as holes or magnetic spots, which may be sensed by a machine to provide signals indicative of the customer's number. The customer's name appears in a printed form 14 along with his address 16. The merchandising organization issuing the card is identified by the printing 18 and the card may additionally bear other information as a signature plate 20 for the bearer and a trademark indication 22 for the organization operating the system of the present invention.

Initially, considering the use of the card of FIG. 1, assume the bearer "John Doe" appears at the organization of "Roe Merchants" either desiring to make a credit purchase or to cash a check, or enter some other transaction wherein credit is extended to "Doe." Immediately prior to the consummation of the transaction, "John Doe" presents his card and a cashier or other person at "Roe Merchants" accept the card first to determine the status of "John Doe," then to record the amount of his purchase if a credit is given. The credit card being associated with "Roe Merchants" (to whom it is presented) simplifies the status vertification for "John Doe" in this assumed instance. The merchandising organization has a list of all void cards bearing their identification; therefore, that normally-short list is compared with the card of "John Doe" to determine whether or not the card has been voided. As the list is kept up to date, this simple check is indicative of a status for "John Doe," and informs the cashier of whether or not "Doe" has a responsible status.

In the event that the card, as shown in FIG. 1, is presented to a merchant other than "Roe Merchants," a different procedure is followed. In this instance, the status of "John Doe" is obtained from the central credit station at which records are maintained for all issued cards. However, as a result of the merchandising organization's checking cards associated with their organization without the need for a central-station inquiry, the number of central-station inquiries is reduced so that the system is feasible in operation. Furthermore, by the central office updating (as on a daily basis) the lists of various merchandising organizations, accurate status reporting is maintained for each card holder.

Considering the system of the present invention in greater detail, reference will now be had to the flow diagram of FIG. 2, which is illustrative of the system logic. Upon presentation of a credit card at a merchandising organization or other facility, the initial question is: whether or not the card is local, i.e., identified with the facility at which it is presented. This question is presented by the block 25 of FIG. 2, having two output lines, one of which indicates "yes," the other of which indicates "no." Should the card be local, the next step is to compare the card number with the local bad list of void cards, as indicated by block 26. The presence of the subject card number on the bad list results in a rejection as indicated by the block 28. However, the absence of the card number on the bad list results in approval as indicated by the block 30.

Upon the presentation of a foreign card, i.e., one which is identified with an organization other than the facility to which it is presented, the inquiry is made to the central station, as indicated by the block 32. This operation is proposed herein to be performed by transmitting the card number to the central station, and employing the card number to locate the status for the subject and also to verify the location of the status as correct.

To accomplish the status location, the card number is employed to address a memory as indicated by block 34, which memory manifests: (1) the status of the subject and (2) a coded or uncoded comparison information indicative of at least a part of the identification number. The status information is passed to a block 36 which provides a conditional transfer. However, the comparison information is applied to a block 38 which also receives information from a block 40 serving to select and possibly code a portion of the identification number. The logical operation represented by the block 38 is to compare the information from the memory with the coded information from the original identification number. If coincidence does not occur a signal is given as indicated by block 42, which means either that an error was made in inserting the information or that the card is counterfeit. However, in the normal consequence, coincidence will occur to condition the passage of the status information from the block 36 to a block 44 which serves to decode the status information into a variety of forms which may include instructions to reject or approve the subject as a credit risk, as indicated by the blocks 28 and 30; or the status may indicate a special situation as indicated by the block 46, which may include any of the following instructions:

(1) The subject is a good credit risk but he has recently cashed many checks.
(2) The subject is wanted by the police; attempt to delay him.
(3) The presented card has been reported lost.

In the operation of the system the vast majority of cards presented at a merchandising establishment will be identified with that establishment so that their operation will be simply to check the card number against their current list of void or bad numbers. The next largest group of situations will involve foreign cards, which upon checking indicate an approved credit status. As a result, the system is expeditious in operation affording reliable status information to the merchandising organization without inconvenience or delay to the customer and minimizing time-consuming operations by the cashier.

Reference will now be made to FIG. 3 for a consideration of a mechanized apparatus to accomplish the system of the present invention. FIG. 3 shows a plurality of remote stations R1, R2, and RN, which function in conjunction with a central station S, through a communication system C, which may be situated at the location of the central station.

Each of the remote stations are located at a merchandising facility for use by a person involved in cash transactions with customers. For example, each of the remote stations may be located at a different super market, restaurant, dry goods store, or other merchandising organization, while the central station may be somewhat centrally located with respect to the various remote stations.

The number of remote stations employed in each system is subject to wide variation; however, normally each of the stations is basically the same. Therefore, only the remote station R1 has been shown in detail.

Further consideration of the system of FIG. 3 may now best be presented by assuming exemplary operations by the system and introducing the elements of the system concurrently with the explanation of their function.

Upon presentation of a credit card to the merchandising facility at which the remote station R1 is located, the card is inserted in a card reader unit 50 which serves to sense the identification number from the card in the form of electrical signals. A variety of different apparatus exists for accomplishing this operation, including punch-card readers and magnetic ink readers. Furthermore, the actual signals produced may take various forms, e.g., binary or decimal; however, in the illustrative embodiment, the card reader unit 50 senses holes punched in the card to provide 14 binary digits in a cable 52 containing 14 coinciding conductors.

Along with the numerical identification of the card, or as a part thereof, the card reader unit senses indicia as a hole 12a on the card to indicate whether or not the card is local. That is, for example, if the presented card is identified with the remote station R1 a critically-placed hole in a certain area of the card permits a pair of contacts (critically placed in the reader) to close and a voltage appears in conductor 55 from the card reader unit. As an alternative example, several holes or keyed slots may be provided to indicate decimal digits which are associated with particular card reader units (i.e. remote stations) so as to identify, by comparison, whether or not a card is local or foreign.

The conductor 55 is normally at a reference level potential along with a conductor 56 which is also provided from the card reader unit 50. The conductor 56 is connected to a source of potential through a "read" switch 58 so that after the card is inserted, the operator actuates the read switch 58 to produce a high potential in the conductor 56. Therefore, in the event that the card in the unit 50 is sensed to be local, high signals occur in both the conductors 55 and 56.

The voltage in the conductor 55 is applied to an "and" gate 60 and after a brief delay incurred by a delay circuit 62, the voltage in the conductor 56 is similarly applied to the "and" gate 60. The delay circuit 62 may comprise a simple delay relay or other mechanism to provide a few seconds delay in passing an electrical signal.

The "and" gate 60 may comprise any of a variety of well-known coincidence circuits, which operate in conjunction with two-level signals and serve to pass a two-level signal upon the occurrence of all input signals being in a high state. In the instant situation (the card being local and the read switch being closed) causes the "and" gate 60 to receive two high signals, thereby resulting in the application of a high signal or pulse through a conductor 64 to a one-cycle motor 66. Various apparatus are satisfactory for use as the motor 66, which serve to accomplish a single revolution on the application of a pulse to an input terminal.

The motor 66 is mechanically connected to a magnetic tape unit 68 having a loop of magnetic tape therein which is scanned by a read head to provide fourteen digit binary parallel signals to a cable 70 having 14 conductors. These parallel signals thus represent a binary number or word.

The gearing between the motor 66 and the tape unit 68 provides that in one cycle of the motor 66 the magnetic tape unit accomplishes a complete scanning of the closed loop of tape therein. Therefore, as the tape is scanned a series of binary numbers (14 digits each) are sequentially provided through a cable 70 to a signal comparator 72. The signal comparator 72 also receives a binary number from the cable 52 carrying the identification number of the card under present consideration.

In function, the signal comparator 72 serves to compare the signals in the cable 52 with those presented through the cable 70 sequentially searching for an identity. This operation is commanded by a signal from the delay circuit 62 and in the event coincidence is detected, an output pulse appears in the conductor 74 from the signal comparator 72.

Various types of signal comparators are well known in the prior art which function to compare one binary numerical value with another binary numerical value and are therefore not described in detail herein. A consideration of such systems is presented in the book "Arithmetic Operations in Digital Computers" by R. K. Richards, published 1955 by D. Van Nostrand Co., Inc., beginning on page 290.

Should the signal comparator 72 dectect identity between any of the binary values presented from the magnetic tape unit 68 and the identification number manifest on the card and presented through the cable 52, the resulting signal in the conductor 74 energizes a "no" signal 76 indicating that the presented card appears on the list of voided cards recorded by the magnetic tape unit with the result that the person presenting the card should be denied credit, and additionally further action may also be taken. Of course, if the "no" signal is not actuated, the operator is informed that the customer's card has not been voided and therefore he is a good credit risk.

The "no" signal may comprise a lamp mounted behind a printed translucent panel which flashes the indicated information upon receiving an electrical pulse. Of course, various other forms for the "no" signal will be apparent to those skilled in the art, which forms are capable of manifesting the presence of the card number under investigation on the void card list.

Returning now to the moment of insertion of a card in the card reader unit 50, assume for purposes of further explanation in this instance, that the card is detected to be "foreign," i.e., not identified with the merchandising organization at which it is presented. Upon such occurrence, the operation is precisely as previously considered, with the exception that the voltage in the conductor 55 remains at reference level. Therefore, the "and" gate remains unqualified and no local operation occurs. This condition exists when the card reader unit senses the card to be "foreign," i.e., not identified with the remote station at which the card is presented. Therefore, an inquiry to the central station is commanded.

A central station inquiry may also be commanded upon insertion of a "local" card by actuating a switch 80 which opens the current path carrying the signal normally indicating a card to be local. This operation may be desired after the card number has been located on the void list when further or more detailed information is desired. In such instances, the switch 80 is actuated resulting in a reference-level signal in the conductor 55, just as when a foreign card is placed in the reader unit.

The reference-level signal in the conductor 55 is applied to an inverter circuit 82 of the type well known for operation with two-state signals, which present an output opposite to the received input. As the input to he inverter 82 is now low, it provides a high output through a conductor 84 to a composite "and" gate 86 which also receives a high signal from the delay circuit 62 through a conductor 81 so that these two signals condition the passage of individual signals in the cable 52 through a cable 88 to a transmitter register 90.

The composite "and" gate 86 represents a plurality of individual "and" gates, each of which receives the signals in the conductors 84 and 87 along with the signal in one conductor of the cable 52. However, in view of the complexity of presenting such a series of "and" gates, the single composite "and" gate 86 symbol is employed. In function, the gate 86 passes the binary signals in the cable 52 (representative of the identification number for the credit card) to a transmitter 90 at the remote station. Therefore, signals representative of the identification number are prepared for transmission to the central station S.

The transmission of the identification signals from the various remote stations to the central station is accomplished through a communication system C which may take a wide variety of forms.

In one operative system, this communication is accomplished by serializing the information signals from each remote station for transmission through a single character path. The information so received at the central station is applied to a multiplexer which channels the inquiries to the central-station computed one at a time, to provide appropriate answers back to the remote stations one at a time. Equipment of this type is well known at present and is commercially available from the International Business Machine Company. As other examples, the communication system may comprise a public or private telephone line or lines, a radio link, or various other well-known communication apparatus. However, in the system of FIG. 3, an exemplary simplified direct-line communication system (physically located at the central station) is disclosed merely as an illustrative embodiment. Output cables from the remote stations carry the identification signals to a gang switch which is capable of receiving the parallel signals from any of the remote stations. Specifically, the cable 92 from the transmitter 90 terminates as a plurality of stationary contacts 94 associated with movable contacts 96 in a gang switch 98. As all the terminals are identical in connection, a single switch is shown to represent the complex gang switch.

The switch 98 is associated with a gang switch 100 that carries output signals from the central station to the individual remote stations as considered below. Various techniques may be employed as well-known in the prior art to couple the central station input and output to a selected remote station; however, for purposes of illustration, the operation of the present system is accomplished manually.

In the operation of the communication system, the signal appearing in the conductor 56 from the card reader unit 50 passes through a conductor 102 to energize a lamp 104 indicating a call from the remote station R1. Upon observing the illuminated lamp 104, the central station operator promptly actuates the movable contacts 96 to dwell on the stationary contacts 94. After a brief delay incurred by the delay circuit 62, the identification signals pass through the composite circuits and cables as previously described to appear in the cable 92, then pass through the gang switch 98 to be applied to a receiver 106 through a cable 108. It is to be noted that similar lamps 110 and 112 along with terminal groups 114 and 116 are provided for the remote stations R2 and RN.

The binary signals applied in parallel form to the receiver 106 are formulated into discrete pulses of uniform amplitude within the receiver which comprises a plurality of pulse-shaping amplifier circuits. These circuits therefore apply well-formed binary signals to an address register 120 that is associated with a coincident-current random-access memory 121. The combination address register 120 and memory 121 may take a variety of forms, as a random-access disk file as well-known in the prior art and now commercially available, or as another example, a static-magnetic random-access memory system formed of toroidal cores and well known in the prior art, an early teaching form of which is shown and described in the Journal of Applied Physics, volume 22, pages 44 through 48, January 1951.

In function, the memory 121 provides the contents of a particular memory word, i.e., group of binary digits in a pair of output cables. The selected word is identified by the address register 120 containing the identification number, and the word is sensed upon the occurrence of a command signal an "and" gate 128 which receives one signal from the inverter 130 (that receives inputs from all the stages in the receiver 106 through a cable 107) and another signal from a switch 109 which is manually depressed by the central station operator on answering a call. Therefore the inverter 130 provides a low signal while pulses are received; however, it provides a high command signal to the gate 128 after the receiver 106 has become quiescent and the binary signals are contained in the address register 120.

The binary words in the memory 121 may comprise four digits, three of which indicate a status for the person identified, and a group of which confirms the correct location of the binary word. Specifically, the following format may be employed.

X111: Wanted—This man is wanted by the police.
X100: OK 1—This person's credit is generally good; however, he has passed one check during the last week.
X010: This person's credit is generally good; however, he has passed two previous checks during the past week.
X001: Lost—This credit card number has been reported as lost.
X011: Bad—This person has a record indicating irresponsibility in financial matters.

The three most significant digits (tabulated information runs from least-significant to most-significant) of the binary numbers or words indicate the various status situations stated above. Of course, various other and additional status types may be added to the above list; however, the list fully explains the principle involved.

The least-significant binary digits represented by an X as a "confirming" code to indicate that the proper word has been located by the memory 121. The three most significant digits are applied to a composite "and" gate 130, the operation of which is conditioned upon the output of a comparators circuit 132 which receives as one input the least-significant digits X of the binary number from the memory 121 through the conductor 122. The other input to the comparator 132 is coded digit identified with the three least-significant binary digits indicative of the identification number. These binary signals are applied from the address register 120 through a pair of conductors to an "or" gate 140 as well-known in the prior art to perform the "or" logic function. The output from that gate is applied to an "and" gate 142, through a conductor 138. The gate 142 also receives an input directly from the address register 120. The "or" gate 140 and the "and" gate 142 treat the three least-significant digits, A, B, and C, of the binary signals indicative of the identification number to accomplish a logic combination $(A+B) \cdot C$, i.e., the product of C and A or B.

The result of this expression may be stored (as the least-significant digit X in the above chart) along with the status for each person carried in the memory 121 and that indicative digit information (the least significant part of the word read from the memory) is applied through a conductor to the comparator 132. Therefore, the comparator 132 functions to sense the similarity of these digits and provides an output to a conductor 144 which will qualify the gate 130 only if coincidence occurred.

The comparator 132 may take a variety of forms as previously considered with reference to a similar circuit in the remote station; however, in the event that a single digit is employed as shown in the illustrative example, the comparator circuit 132 becomes a rather simple pair of coincidence circuits.

It is to be appreciated that a wide variety of coding techniques may be employed, or, preselected digits may be used directly (without coding) from the identification number to be compared with certain digits stored along with the status in the memory. In general, this operation is that of associating certain preselected digits of the identification number with signals registered in the memory along with a person's status, so that comparison between these values results in a check to assure the location of the proper word in the memory 121.

The signal resulting from a favorable comparison qualifies the gate 130 as indicated above, resulting in the status signals passing through a cable 148, a gang switch 150 (shown as a single cable switch) and a cable 152 to a transmitter 154. The output from the transmitter applies the status signals through the gang switch 100 (shown as a single cable swich), which in this instance simply includes three movable contacts 160 and three stationary contacts 162, then through a similar gang switch 164 at the remote station R1, through a receiver 166, which functions to reform these signals into discrete, neat pulses, that are applied through a cable 168 to a decoder 170. The decoder functions in accordance with the above considered logic to decode the parallel signals into one of a plurality of outputs, indicative of various status. Specifically, the decoder 170 has five output conductors, 172, 173, 174, 175, and 176. These conductors are respectively connected to the signals "Bad" 178, "Lost 180, "OK 2" 182, "OK 1" 184, and "Want" 186 which are similar to the signal 76. Therefore, the decoder functions in accordance with the following logic to selectively energize one of the output conductors depending upon the particular binary signals received.

| Conductor | Signal Given | Logic in cable 163 |
| --- | --- | --- |
| 172 | Bad | 011 |
| 173 | Lost | 001 |
| 174 | OK 2 | 010 |
| 175 | OK 1 | 100 |
| 176 | Want | 111 |

Thus, a particular status is manifest in response to the inquiry which informs the cashier or other person at the remote station of the possible risk in either cashing a check or providing goods or services to the person presenting the credit card.

In the operation of the disclosed system, it is important that the various information received relative to each card holder be placed in the memory 121 at the central station so that each status report is current, for example on a daily basis. Of course, various techniques may be employed to compile such information; however, it will normally be desirable to accomplish compilation on a magnetic tape or other apparatus, which forms no part of the present invention, and which may be connected to the address register 120 and the memory 131 through a pair of cables 190 and 192, respectively, whereby to revise the contents of various words in the memory. Of course a wide variety of other techniques may be employed; however, in any event periodic updating is desirable to successful operation.

It is also desirable to update the lists of void cards at remote stations, and this operation may also be accomplished on a daily basis. In general, it has been found feasible to operate by first compiling a new list for each remote station in information blocks on a magnetic tape. The magnetic tape is then sensed by a tape reader 200 having an output cable 202 which is connected to a set of stationary terminals 204 (shown singly) of the gang switch 150.

Preferably, the updating operation is accomplished after business hours and to permit such updating the operator of each remote station moves the switch 164 to its lower position and through the tape unit 68 switch 68a to "record" upon going off duty. The operator at the central station then moves the contents of the gang switch 150 to engage the contacts 204 and initiates the block reader 200 so that the first information sensed is a new list of void numbers for the remote station R1. Signals representative of these void numbers then pass from the tape reader 200 through the switch 150, the cable 152, the transmitter 154, the gang switch 100, the switch 164, and a cable 206 to be applied both to the one-cycle motor 66 and the input of the magnetic tape unit 68. The first signal initiates the operation of the one-cycle motor and the following signals are all recorded by the magnetic tape unit to provide an updated list of void numbers. It is to be noted, that many signals are applied to the one-cycle motor 66; however, recording ceases at the end of the list and therefore although the motor 66 passes through an additional cycle, such cycle is of no consequence to the system.

In accordance with this mode of operation when the operator completes the transmission to remote station R1, the tape reader 200 is stopped, the gang switches 96 and 100 are moved to engage the next terminals and a similar transmission is effected to the remote station R2. As a result, each of the remote stations is provided with an up-to-date list of void card numbers at the start of the business day.

An important feature of the present invention resides in providing several distinct types of credit cards, each type being associated with a particular merchandising organization or other facility, so that upon presentation of such cards at the associated facility, local checking may be accomplished. This feature renders feasible the operation of obtaining a status report prior to virtually every transaction involving credit or cash outlay.

It should be noted that the particular embodiment of the invention described is fully capable of providing the advantages and achieving the objects set forth, such embodiment is merely illustrative and this invention is not limited to the details of construction illustrated and described herein except as defined by the appended claims.

What is claimed is:

1. A system for indicating a status for persons by use of a card with personal identification thereon, when one of said persons presents his card at any of a plurality of remote stations remote from a central station, one remote station of which is identified with each of said cards comprising: first means at each of said remote stations for sensing said cards to provide identification signals representatve of the personal identification thereon, and local signals manifesting a card to be identified or not identified with the remote station at which it is presented; second means at each of said remote stations for recording signals representing a list of personal identifications for persons having a predetermined status and a card identified with such remote station; third means at each of said remote stations for comparing signals from said first means with signals from said second means, and operative upon said local signals indicating a card identified with the remote station at which it is presented; fourth means at each of said remote stations for manifesting the results of the comparison performed by said third means; fifth means at said central station for recording signals representing status for said persons; sixth means at said central station for providing status signals representing a status recorded by said fifth means, upon said local signals indicating a card not identified with the remote station at which it is presented and under control of said identification signals from said first means; and seventh means at each of said remote stations for receiving and manifesting status signals selectively from said sixth means.

2. A system according to claim 1, wherein said fifth means further serves for recording check signals comparable to at least part of each of said identification signals, and further including means for verifying the correct operation of said sixth means by conditioning the provision of said status signals upon a successful comparison of said check signals and said part of each of said identification signals received.

3. A system according to claim 1, further including eighth means at said central station for revising the signals recorded by said second means.

4. A system for indicating an individual status for persons upon presentation of a card bearing personal identification at any of a plurality of remote stations removed from a central station, one of said remote stations being identified with individual cards, comprising:
    sensing means at each of said remote stations for providing signals from a presented card indicative of personal identification and station identification;
    record means at each of said remote stations for recording a plurality of personal identifications;
    test means at each of said remote stations operative upon said station identification signals identifying the instant operating station, to test the personal identification signals against the personal identifications recorded in said record means at said remote station to provide first indicating signals;
    memory means at said central station for recording status information on said persons;
    communication means at said remote stations operative upon said station identification signals identifyng other than said instant operating station, to communicate said personal identification signals to said central station;

control means at said central station for providing second indicating signals from said memory means upon receiving personal identification signals from a remote station; and indicating means at each of said remote stations for indicating an individual status under control of said first and second indicating signals.

5. A system according to claim 4 wherein said central station means further comprises, means for periodically providing a revised list of personal identifications to each of said remote stations.

6. A system according to claim 4 wherein said record means each comprise a magnetic-tape unit for recording a list of personal identifications of a preselected status.

7. A system according to claim 4 wherein said test means comprises a signal comparator and means for sensing signals from said record means for application to said signal comparator coincidentally with said personal identification signals.

8. A system according to claim 4 wherein said control means comprises means for addressing said memory means with said personal identification signals and said test means includes means for addressing said record means with said personal identification signals whereby signals may be provided that are indicative of plural different status indications.

References Cited

UNITED STATES PATENTS

| | | | |
|---|---|---|---|
| 939,245 | 11/1909 | Greenwald | 340—147 |
| 2,914,746 | 11/1959 | James | 340—149 |
| 2,975,282 | 3/1961 | Schaffer | 235—61.7 |
| 3,121,159 | 2/1964 | Rogu | 235—61.7 X |
| 3,200,194 | 8/1965 | Rabinow | 235—61.11 X |

MAYNARD R. WILBUR, *Primary Examiner.*